US012773908B2

(12) United States Patent
Nakayama et al.

(10) Patent No.: US 12,773,908 B2
(45) Date of Patent: Oct. 27, 2026

(54) DRIVING FORCE CONTROL APPARATUS FOR FOUR-WHEEL DRIVE VEHICLE

(71) Applicant: Honda Motor Co., Ltd., Tokyo (JP)

(72) Inventors: Shigeru Nakayama, Tokyo (JP); Akira Kito, Tokyo (JP); Masaya Miura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/914,294

(22) Filed: Oct. 14, 2024

(65) Prior Publication Data

US 2025/0196657 A1 Jun. 19, 2025

(30) Foreign Application Priority Data

Dec. 15, 2023 (JP) ................................ 2023-212132

(51) Int. Cl.
*B60L 15/20* (2006.01)
*B60K 17/354* (2006.01)
(Continued)

(52) U.S. Cl.
CPC ............ *B60L 15/20* (2013.01); *B60K 17/354* (2013.01); *B60K 17/356* (2013.01); *B60K 23/0808* (2013.01); *B60K 2023/0858* (2013.01); *B60L 2240/12* (2013.01); *B60L 2240/16* (2013.01); *B60L 2240/18* (2013.01);
(Continued)

(58) Field of Classification Search
CPC .. B60L 15/20; B60L 2240/12; B60L 2240/16; B60L 2240/18; B60L 2240/24; B60L 2240/42; B60L 2240/46; B60L 2240/465; B60L 2250/00; B60L 2250/26; B60L 2250/28; B60L 2260/28; B60K 17/354; B60K 17/356; B60K 23/0808; B60K 2023/0858; B60Y 2400/82; B60W 30/045; B60W 2520/10; B60W 2540/10;
(Continued)

(56) References Cited

FOREIGN PATENT DOCUMENTS

| | | |
|---|---|---|
| JP | 2007030845 A * | 2/2007 |
| JP | 2012187984 | 10/2012 |

(Continued)

*Primary Examiner* — Maceeh Anwari
(74) *Attorney, Agent, or Firm* — JCIPRNET

(57) ABSTRACT

A driving force control apparatus (1) is configured to determine a front and rear wheel drive distribution which is a ratio of driving force between front wheels (21) and rear wheels (22) in a four-wheel drive vehicle, and configured to calculate positive or negative standard driving acceleration (XG) obtained based on an input amount from a driving force instruction device (42) of the vehicle and a vehicle speed, and based on the standard driving acceleration (XG), switch between and perform dynamic load ratio distribution control that determines the front and rear wheel drive distribution in accordance with a dynamic load ratio distribution curve (L1) which is a curve of a dynamic load ratio applied to the front wheels and the rear wheels with respect to the standard driving acceleration (XG), and rear wheel-biased distribution control that determines the front and rear wheel drive distribution in accordance with a rear wheel-biased distribution curve (L2) which increases a rear wheel drive distribution compared to the dynamic load ratio distribution curve.

19 Claims, 5 Drawing Sheets

(51) Int. Cl.
*B60K 17/356* (2006.01)
*B60K 23/08* (2006.01)

(52) U.S. Cl.
CPC ....... *B60L 2240/24* (2013.01); *B60L 2240/42* (2013.01); *B60L 2240/46* (2013.01); *B60L 2240/465* (2013.01); *B60L 2250/00* (2013.01); *B60L 2250/26* (2013.01); *B60L 2250/28* (2013.01); *B60L 2260/28* (2013.01); *B60Y 2400/82* (2013.01)

(58) Field of Classification Search
CPC ......... B60W 2540/12; B60W 2540/18; B60W 2720/30
USPC .......................................................... 701/22
See application file for complete search history.

(56) References Cited

FOREIGN PATENT DOCUMENTS

| | | | |
|---|---|---|---|
| JP | 2012187984 A | * | 10/2012 |
| JP | 7310703 | | 7/2023 |

* cited by examiner

DRIVING FORCE CONTROL APPARATUS FOR FOUR-WHEEL DRIVE VEHICLE

CROSS-REFERENCE TO RELATED APPLICATION

This application claims the priority benefits of Japanese application no. 2023-212132, filed on Dec. 15, 2023. The entirety of the above-mentioned patent application is hereby incorporated by reference herein and made a part of this specification.

BACKGROUND

Technical Field

The disclosure relates to a driving force control apparatus for a four-wheel drive vehicle.

Description of Related Art

Conventionally, a driving force control apparatus for a four-wheel drive vehicle is known, which monitors longitudinal acceleration using an in-vehicle accelerometer, calculates the dynamic loads applied to the front wheels and rear wheels in consideration of the pitching direction moment caused by this longitudinal acceleration, and distributes the front and rear driving forces (controls the front and rear dynamic load distribution) so that the ratio of driving force for the dynamic loads on the front wheels and rear wheels does not exceed the traction limit of the tires (Japanese Patent Application Laid-Open No. 2012-187984).

There is also a driving force control apparatus that further monitors lateral acceleration during turning, calculates the dynamic load applied to each of the left wheels and right wheels in consideration of the rolling direction moment generated by this lateral acceleration, and distributes the front and rear driving forces (controls the inner wheel dynamic load ratio distribution) so that the ratio of the larger driving force to this dynamic load (the inner wheel side during turning) does not exceed the traction limit of the tires (Japanese Patent No. 7310703).

Furthermore, a technique is known which calculates the yaw rate based on the value of a G sensor and feedback-controls the front and rear driving force distribution ratio, but feedback control based on the yaw rate has the drawback of slow response in control.

The best front and rear wheel driving force distribution for traction, that is, the front and rear wheel driving force distribution for favorable off-road capability on low-u roads such as snow, is said to be approximately half front and half rear. As this driving force distribution becomes more biased to the front or rear, the traction performance on low-u roads decreases.

On the other hand, from the viewpoint of handling performance, FF vehicles (100% front wheel drive distribution) have a tendency to understeer (US), while FR vehicles (100% rear wheel drive distribution) have a tendency to oversteer (OS). With the best front and rear wheel driving force distribution for traction, that is, approximately half front and half rear, the steering characteristics are intermediate between US and OS, but since the linearity of the turning radius relative to acceleration (steering characteristics) is not constant, it is necessary to make fine correction to the accelerator and steering when cornering. The steering characteristics are constant in a region where the rear wheel drive distribution is slightly higher (best handling region), and when driving in this region, there is no need to make fine correction to the accelerator and steering when cornering.

Because the best front and rear wheel drive distribution for traction differs from the best front and rear wheel drive distribution for handling, the conventional driving force control apparatus has the problem that it cannot always achieve both excellent traction performance and excellent handling performance.

The disclosure provides a driving force control apparatus which is capable of obtaining excellent handling performance while maintaining excellent traction performance.

SUMMARY

A driving force control apparatus (1) according to the disclosure is configured to determine a front and rear wheel drive distribution which is a ratio of driving force between front wheels (21) and rear wheels (22) in a four-wheel drive vehicle, and configured to calculate positive or negative standard driving acceleration (XG) obtained based on an input amount from a driving force instruction device (42) of the vehicle and a vehicle speed, and based on the standard driving acceleration (XG), switch between and perform dynamic load ratio distribution control that determines the front and rear wheel drive distribution in accordance with a dynamic load ratio distribution curve (L1) which is a curve of a dynamic load ratio applied to the front wheels and the rear wheels with respect to the standard driving acceleration (XG), and rear wheel-biased distribution control that determines the front and rear wheel drive distribution in accordance with a rear wheel-biased distribution curve (L2) which increases a rear wheel drive distribution compared to the dynamic load ratio distribution curve.

BRIEF DESCRIPTION OF THE DRAWINGS

FIG. 4A and FIG. 4B are conceptual diagrams showing the load change applied to the wheel due to the moment caused by acceleration, wherein FIG. 4A shows the load change due to longitudinal acceleration, and FIG. 4B shows the load change due to lateral acceleration.

DESCRIPTION OF THE EMBODIMENTS

Figure 1:
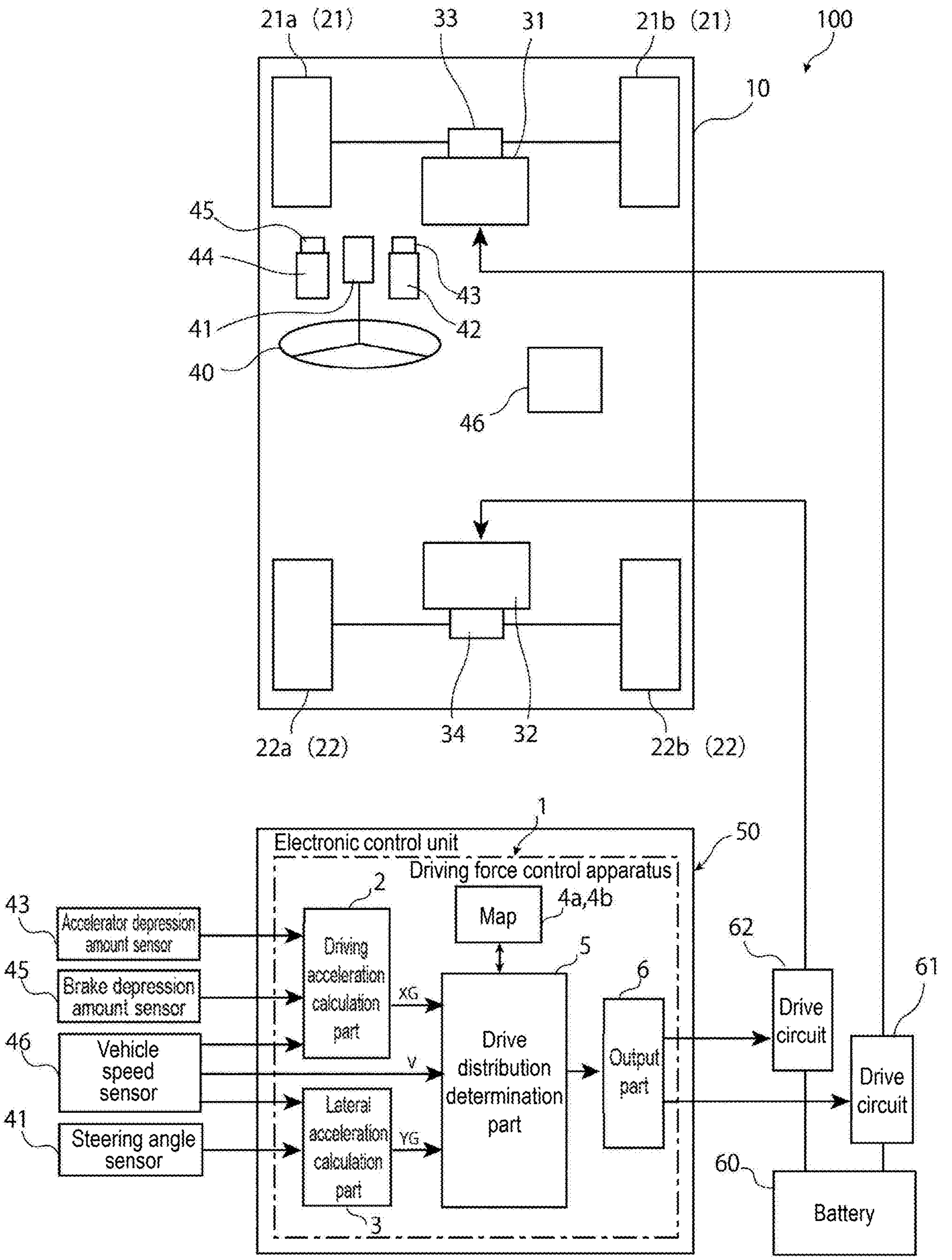
FIG. 1 is a block diagram showing the configuration of the driving force control apparatus according to an embodiment of the disclosure.

A driving force control apparatus (1) according to the disclosure is configured to determine a front and rear wheel drive distribution which is a ratio of driving force between front wheels (21) and rear wheels (22) in a four-wheel drive vehicle, and configured to calculate positive or negative standard driving acceleration (XG) obtained based on an input amount from a driving force instruction device (42) of the vehicle and a vehicle speed, and based on the standard driving acceleration (XG), switch between and perform dynamic load ratio distribution control that determines the front and rear wheel drive distribution in accordance with a dynamic load ratio distribution curve (L1) which is a curve of a dynamic load ratio applied to the front wheels and the rear wheels with respect to the standard driving acceleration (XG), and rear wheel-biased distribution control that determines the front and rear wheel drive distribution in accordance with a rear wheel-biased distribution curve (L2) which increases a rear wheel drive distribution compared to the dynamic load ratio distribution curve.

While dynamic load ratio distribution control with favorable traction performance is the basis, the vehicle has good traveling stability when the acceleration/deceleration of the vehicle is small, so this configuration can switch to rear wheel-biased distribution control with favorable handling performance to stabilize characteristics such as over-steer and under-steer. In addition, since the standard driving acceleration (XG) (target value of acceleration) is calculated from the instruction amount of the driving force instruction device (accelerator, brake, or the like) and the control is performed based on this, responsiveness is improved compared to feedback based only on actual acceleration or the like.

It is preferable that the dynamic load ratio distribution curve (L1) and the rear wheel-biased distribution curve (L2) are curves in which the rear wheel drive distribution increases as the standard driving acceleration (XG) increases, except for a transition curve (L3, L4) therebetween.

According to this configuration, the dynamic load ratio distribution curve reduces the ratio of driving force to the dynamic load applied to the front wheels and rear wheels in consideration of the pitching direction moment caused by the longitudinal acceleration, thereby increasing the margin relative to the tire traction limit. In addition, the rear wheel-biased distribution curve also provides a relatively large margin relative to the tire traction limit even under conditions of a high rear wheel drive distribution.

It is preferable that the driving force control apparatus (1) performs the rear wheel-biased distribution control in response to the standard driving acceleration (XG) being equal to or smaller than a first input amount (XG1), and it is preferable that this first input amount (XG1) is standard driving acceleration (XG) that provides acceleration at a limit at which drive wheels do not slip on a road surface in a predetermined condition (dry, wet, snowy).

Further, it is preferable that the driving force control apparatus (1) performs the rear wheel-biased distribution control in response to the standard driving acceleration (XG) being equal to or larger than a second input amount (XG2), and it is preferable that this second input amount (XG2) is standard driving acceleration (XG) that provides deceleration at a limit at which drive wheels do not slip on a road surface in a predetermined condition (dry, wet, snowy).

According to this configuration, when there is no sudden acceleration or deceleration and the acceleration or deceleration is within the traction limit in the predetermined road surface conditions, the rear wheel-biased distribution control is performed, thereby making it possible to improve handling performance.

It is preferable that the driving force control apparatus (1) is configured so that a value of the first input amount (XG1) is changeable by a mode switching operation of a driver, and it is also preferable that a value of the second input amount (XG2) is changeable by a mode switching operation of a driver.

This configuration provides the Sport mode which assumes only dry and wet road surfaces and expands the acceleration/deceleration range in which rear wheel-biased distribution control is performed, and the Normal mode which assumes snowy road surfaces in addition to dry and wet road surfaces and narrows the acceleration/deceleration range in which rear wheel-biased distribution control is performed, and can ensure a wide region of high handling performance in the Sport mode when the road surface is known to be not slippery as well as ensure stability in the Normal mode when the road surface is known to be slippery.

It is preferable that the driving force control apparatus (1) does not perform the rear wheel-biased distribution control in response to standard lateral acceleration (YG) calculated based on a steering amount of a steering device of the vehicle and the vehicle speed being equal to or larger than a third input amount (YG3), and it is preferable that the third input amount (YG3) is standard lateral acceleration (YG) at a limit at which drive wheels do not slip on a road surface in a predetermined condition.

According to this configuration, when lateral acceleration occurs due to sudden steering, rear wheel-biased distribution control is not performed, thereby making it possible to ensure traveling stability. Furthermore, since the control is based on the standard lateral acceleration (YG) (target value of acceleration) calculated based on the amount instructed by the driver such as the steering angle of the steering wheel, responsiveness is improved compared to feedback based only on actual acceleration or the like.

It is preferable that the driving force control apparatus (1) does not perform the rear wheel-biased distribution control in response to the vehicle speed (V) of the vehicle being lower than a first predetermined speed (V1), and it is preferable that the rear wheel-biased distribution control is not performed in response to the vehicle speed (V) being higher than a second predetermined speed (V2).

According to this configuration, when the vehicle travels at a low speed immediately after starting and immediately before stopping which requires traction, or when the vehicle travels at a high speed which requires traveling stability, rear wheel-biased distribution control is not performed regardless of the front/rear and left/right acceleration/deceleration. Therefore, traction and traveling stability can be ensured in these cases.

It is preferable that a drive source for the front wheels of the vehicle to which the driving force control apparatus (1) is applied is a drive source including an electric motor, it is preferable that a drive source for the rear wheels of the vehicle is a drive source including an electric motor, and it is preferable that a drive source for the front wheels and rear wheels of the vehicle is a drive source including an electric motor.

It is preferable that the driving force control apparatus (1) has a map in which the vehicle speed (V), standard lateral acceleration (YG) calculated based on a steering amount of a steering device, standard driving acceleration (XG) calculated based on the input amount from the driving force instruction device, and the front and rear wheel drive distribution (Rr) are recorded, and the front and rear wheel drive distribution (Rr) is determined based on the map.

According to this configuration, the rear wheel drive distribution can be determined more quickly compared to calculation based on computation, thereby increasing the speed of controlling the driving forces for the front and rear wheels.

It is preferable that the driving force instruction device (42, 44) is at least one of an accelerator pedal (accelerator operator) and a brake pedal (brake operator), and the input amount from the driving force instruction device is at least one of the depression amount (operation amount) of the accelerator pedal and the depression amount (operation amount) of the brake pedal.

According to these configurations, the standard driving acceleration (XG) (target value of acceleration) is calculated from the instruction amount of the driver such as accelerator operation amount and brake operation amount, and the control is performed based on this, so responsiveness is improved compared to feedback based only on actual acceleration or the like.

The driving force control apparatus according to the disclosure switches between best traction control, which determines the rear wheel drive distribution in accordance with the optimal traction curve, and rear wheel-biased distribution control, which determines the rear wheel drive distribution in accordance with the rear wheel-biased distribution curve, based on the standard driving acceleration (target value of acceleration). Therefore, the traction performance during traveling can be maintained when traction is required, such as during high acceleration/deceleration, and excellent handling performance can also be obtained when there is sufficient traction, such as during low acceleration/deceleration.

Hereinafter, embodiments of the disclosure will be described in detail with reference to the accompanying drawings.

FIG. 1 is a block diagram showing an example of the configuration of a vehicle 100 including a driving force control apparatus 1 according to an embodiment of the disclosure. The vehicle 100 shown in FIG. 1 is a four-wheel drive electric vehicle, and includes a main body 10, left and right front wheels 21*a* and 21*b* (hereinafter also simply referred to as "front wheels 21"), left and right rear wheels 22*a* and 22*b* (hereinafter also simply referred to as "rear wheels 22"), a front wheel drive motor 31, a rear wheel drive motor 32, a front wheel differential mechanism 33, and a rear wheel differential mechanism 34. The left and right front wheels 21*a* and 21*b* are configured to be driven by the front wheel drive motor 31 via the front wheel differential mechanism 33, and the left and right rear wheels 22*a* and 22*b* are configured to be driven by the rear wheel drive motor 32 via the rear wheel differential mechanism 34.

The vehicle 100 further includes, as operating devices, a steering wheel (steering device) 40, a steering angle sensor 41 that detects the steering amount of the steering wheel, an accelerator pedal (accelerator operator) 42, an accelerator depression amount sensor 43 that detects the depression amount (operation amount) of the accelerator pedal 42, a brake pedal (brake operator) 44, a brake depression amount sensor 45 that detects the depression amount (operation amount) of the brake pedal 44, and a vehicle speed sensor 46.

The vehicle 100 further includes a battery 60, a front wheel drive circuit 61, and a rear wheel drive circuit 62 as a drive system, and an electronic control unit (ECU) 50 as a control system. The electronic control unit 50 is a unit including a CPU (not shown) for operational control, a memory (not shown) for storing operational programs, a memory (not shown) for saving data, etc., and is configured as, for example, a microcomputer. The electronic control unit 50 is configured to control the front wheel drive circuit 61 and the rear wheel drive circuit 62, and to control the power supplied from the battery 60 to the front wheel drive motor 31 and the rear wheel drive motor 32, thereby controlling the driving forces thereof.

The driving force control apparatus 1 of this embodiment is an apparatus that determines the front and rear wheel drive distribution, and in this embodiment, the electronic control unit 50 is configured with a program that enables the CPU (not shown) to operate. The driving force control apparatus 1 includes a driving acceleration calculation part 2, a lateral acceleration calculation part 3, maps 4*a* and 4*b*, a drive distribution determination part 5, and an output part 6.

The driving acceleration calculation part 2 calculates the positive or negative standard driving acceleration XG (target value of acceleration) based on the depression amount of the accelerator pedal 42 detected by the accelerator depression amount sensor 43 and the current vehicle speed V detected by the vehicle speed sensor 46, and inputs the same to the drive distribution determination part 5. This is because the actual driving acceleration of the vehicle is considered to be determined by the difference between the driving force determined by the depression amount of the accelerator pedal 42 and the air resistance and regenerative resistance determined by the current vehicle speed V.

The driving acceleration calculation part 2 further calculates the negative standard driving acceleration XG (target value of acceleration) based on the depression amount of the brake pedal 44 detected by the brake depression amount sensor 45 and the current vehicle speed V detected by the vehicle speed sensor 46, and inputs the same to the drive distribution determination part 5. This is because the actual driving acceleration of the vehicle is considered to be determined by the sum of the braking force determined by the depression amount of the brake pedal 44 and the air resistance and regenerative resistance determined by the current vehicle speed V.

The lateral acceleration calculation part 3 calculates the positive or negative standard lateral acceleration YG (target value of acceleration) based on the steering angle of the steering wheel (steering device) 40 detected by the steering angle sensor 41 and the current vehicle speed V detected by the vehicle speed sensor 46, and inputs the same to the drive distribution determination part 5. Since the control is based on the amounts instructed by the driver such as accelerator depression amount and brake operation amount, responsiveness is improved compared to feedback control based only on actual acceleration or the like.

The maps 4*a* and 4*b* are data in which the vehicle speed V, standard lateral acceleration YG, standard driving acceleration XG, and optimal rear wheel drive distribution (rear wheel distribution ratio Rr) are recorded in advance, and are saved in the memory (not shown) that saves data of the electronic control unit (ECU) 50 for the drive distribution determination part 5 to refer to. Details will be described later.

The drive distribution determination part 5 is a program that determines the front and rear wheel drive distribution based on the standard driving acceleration XG input from the driving acceleration calculation part 2, the standard lateral acceleration YG input from the lateral acceleration calculation part 3, and the vehicle speed V input from the vehicle speed sensor 46. The detailed operation will be described later.

The output part 6 is a program that controls the front wheel drive circuit 61 and the rear wheel drive circuit 62 in accordance with the front and rear wheel drive distribution determined by the drive distribution determination part 5, and controls the power supplied from the battery 60 to the front wheel drive motor 31 and the rear wheel drive motor 32 to control the driving forces thereof.

Next, the control of the front and rear wheel drive distribution performed by the driving force control apparatus 1 configured as above will be described for each condition.

Figure 2:
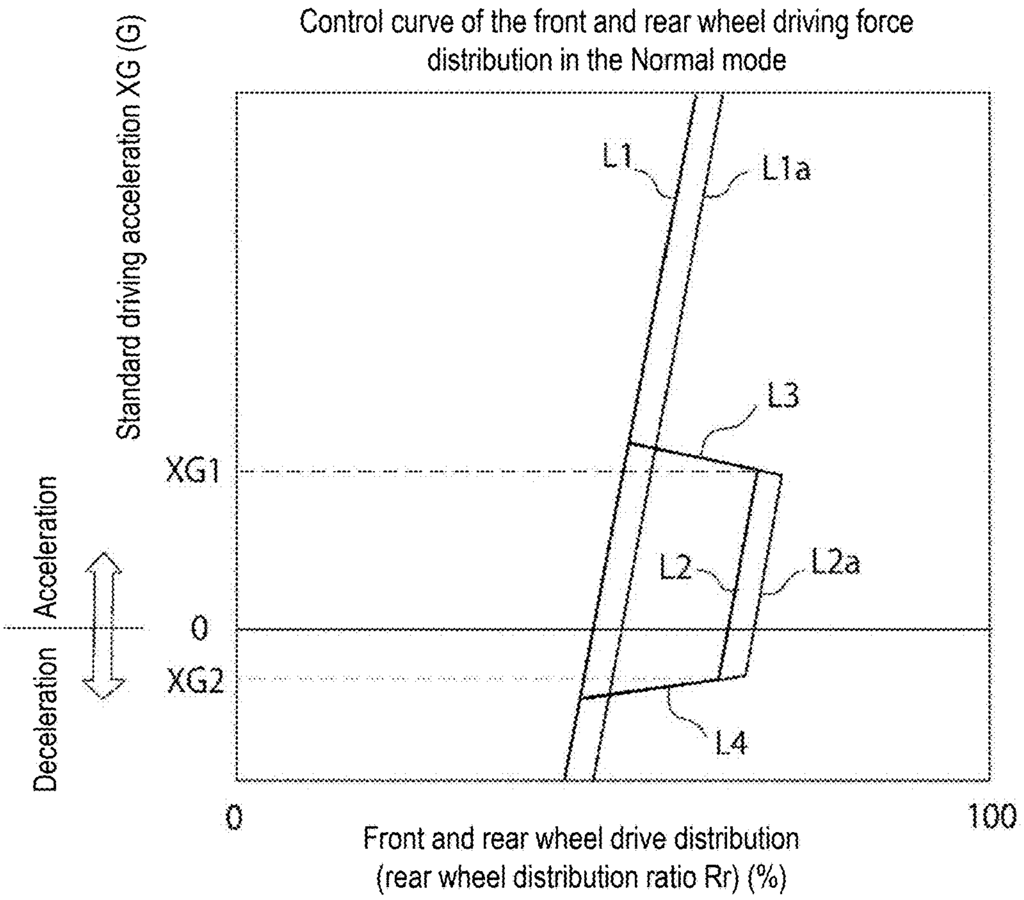
FIG. 2 is a diagram showing the control curve of the front and rear wheel driving force distribution in the Normal mode.

(1) Dynamic Load Ratio Distribution Control (Best Traction Control) when Traveling Straight in the Normal Mode FIG. 2 is a diagram showing the control curve of the front and rear wheel driving force distribution (represented by the rear wheel distribution ratio Rr) with respect to the standard driving acceleration XG in the Normal mode. The drive distribution determination part 5 basically performs dynamic load ratio distribution control that determines the front and rear wheel drive distribution in accordance with a dynamic load ratio distribution curve L1 shown in FIG. 2.

Figure 3:
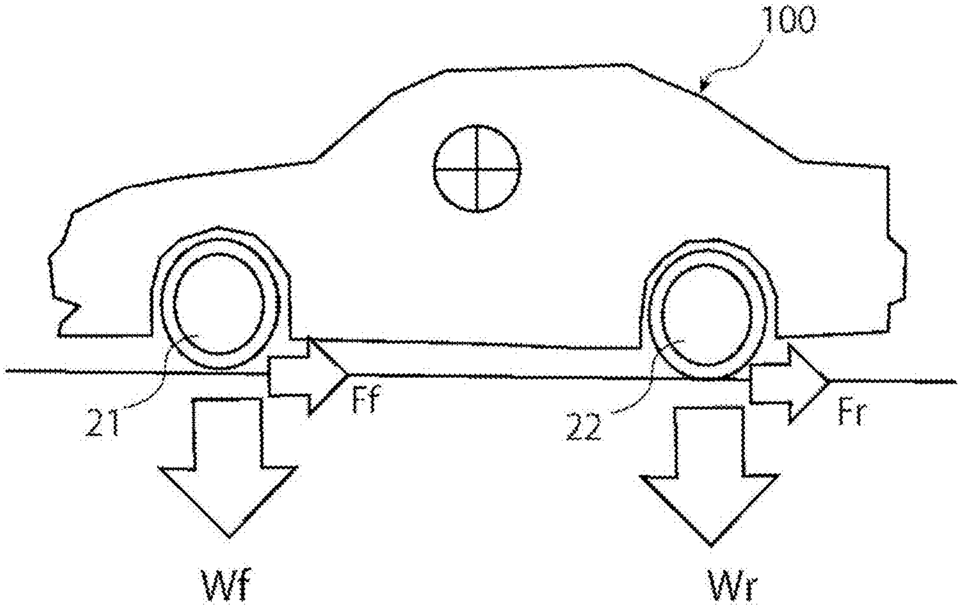
FIG. 3 is a diagram showing the loads and driving forces of the front wheels and rear wheels.

The dynamic load ratio distribution curve L1 is a curve of the dynamic load ratio (horizontal axis) applied to the front wheels 21 and the rear wheels 22 with respect to the standard driving acceleration XG (vertical axis). This dynamic load ratio is the ratio of the loads Wf and Wr applied to the front wheels 21 and the rear wheels 22 shown in FIG. 3 when the vehicle is traveling, and is the load ratio obtained by adding the load change ΔWx applied to the front wheels 21 and the rear wheels 22 due to the pitching direction moment caused by the longitudinal acceleration ax shown in FIG. 4A to the loads Wf and Wr when the vehicle is stationary. Therefore, the dynamic load ratio distribution curve L1 shown in FIG. 2 coincides with the static load ratio when the standard driving acceleration XG is zero, and as the standard driving acceleration XG increases (upward), the load change ΔWx (see FIG. 4A) increases, so the rear wheel distribution ratio Rr increases (shifts to the right).

In the dynamic load ratio distribution control that determines the front and rear wheel drive distribution in accordance with this dynamic load ratio distribution curve L1, the ratios of driving force to dynamic load at the front wheels 21 and the rear wheels 22 (Ff/Wf and Fr/Wr in FIG. 3) are the same and neither ratio becomes significantly larger. Therefore, there is a large margin up to the traction limit where the ratios of driving force to dynamic load (Ff/Wf and Fr/Wr) reach the friction coefficient μ between the road surface and the tires. Thus, the dynamic load ratio distribution control can ensure favorable traction performance even under various road surface conditions and acceleration/deceleration conditions.

Figure 4A:
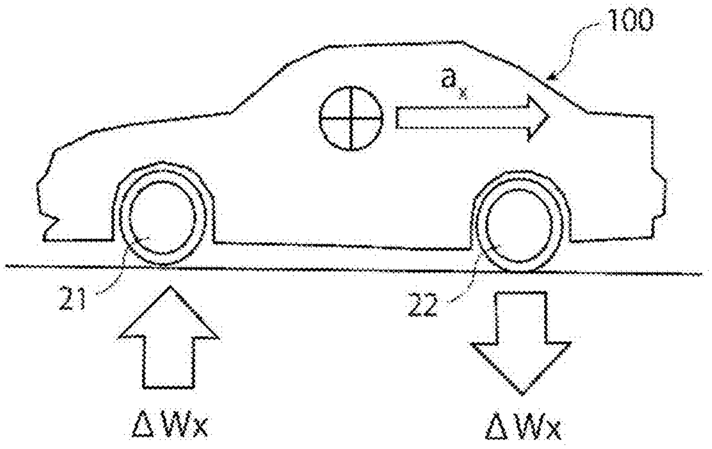
Figure 5:
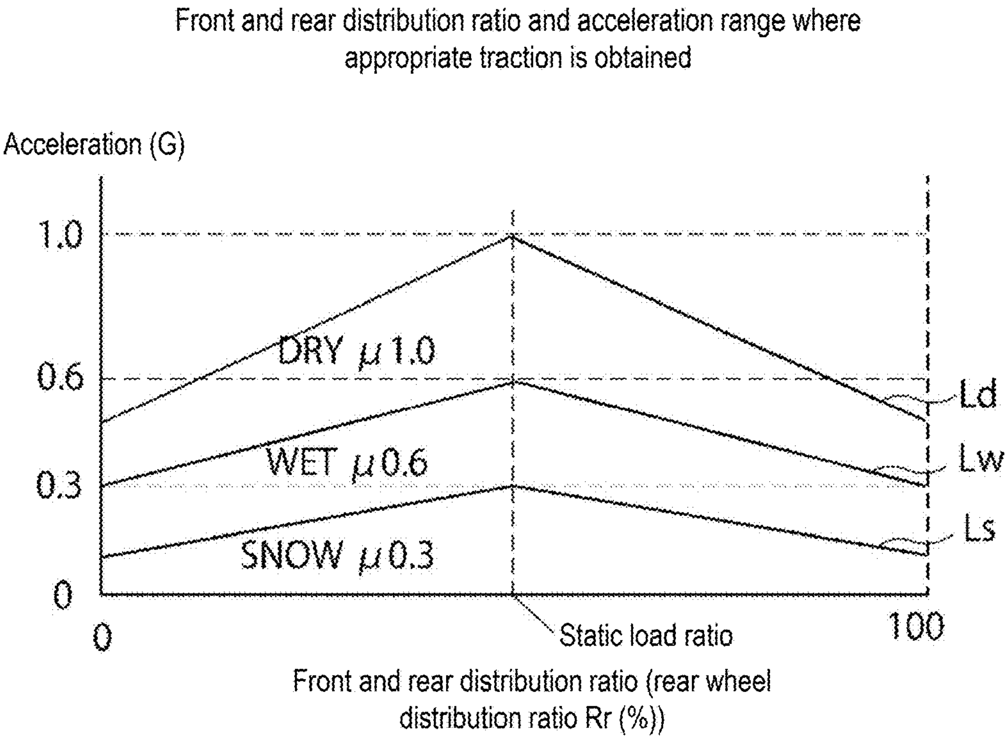
FIG. 5 is a conceptual diagram showing the traction limits in various road surface conditions.

FIG. 5 is a conceptual diagram showing the traction limits in various road surface conditions, with the vertical axis showing driving acceleration and the horizontal axis showing front and rear wheel drive distribution (rear wheel distribution ratio Rr). The friction coefficient μ between the tires and the road surface is said to be about 1.0 on a dry road surface (DRY), about 0.6 on a wet road surface (WET), and about 0.3 on a snow-covered road surface (SNOW). When the front and rear wheel drive distribution ratio (Rr) (horizontal axis) is set to be the same as the static load ratio or dynamic load ratio, the ratios of driving force to load respectively at the front wheels 21 and the rear wheels 22 (Ff/Wf and Fr/Wr in FIG. 3) are equal to the ratio of driving force to weight of the entire vehicle (the same as the ratio of driving acceleration to gravitational acceleration on the vertical axis), so the ratio of driving acceleration to gravitational acceleration (vertical axis) can be increased to the friction coefficient μ for each road surface condition. On the other hand, if the front and rear wheel drive distribution (horizontal axis) is deviated from the static load ratio, the ratios of driving force to load at the front wheels 21 and the rear wheels 22 (Ff/Wf and Fr/Wr in FIG. 3) are different and one is larger than the ratio of driving acceleration to gravitational acceleration (vertical axis), so the ratio of driving acceleration to gravitational acceleration (vertical axis) cannot be increased to the friction coefficient μ. Therefore, in FIG. 5, the traction limit lines Ld, Lw, and Ls for the road surface conditions reach a peak (friction coefficient μ) approximately in the center (static load ratio) and decrease toward the left and right. (It should be noted that FIG. 5 does not take into consideration the load change ΔWx shown in FIG. 4A, and if this is taken into consideration, the traction limit lines Ld, Lw, and Ls deform to shift further to the right as they go up.) Since the dynamic load ratio distribution curve L1 of the dynamic load ratio distribution control passes through the peaks of the traction limit lines Ld, Lw, and Ls, favorable traction performance can be obtained over a wide acceleration range.

FIG. 5 shows only the positive acceleration range and does not show the negative acceleration (deceleration) range, but it is considered that even in the negative acceleration (deceleration) range, there is a traction limit line (not shown) that is symmetrical above and below the curve in the positive acceleration range. Therefore, even in the negative acceleration (deceleration) range, the dynamic load ratio distribution curve L1 of the dynamic load ratio distribution control passes through the peak of each traction limit line (not shown), so favorable traction performance can be obtained over a wide acceleration range.

However, since slippage is generally likely to occur during deceleration, a safety factor is applied in design to reduce the absolute acceleration value of each traction limit line (not shown).

(2) Rear Wheel-Biased Distribution Control (Best Handling Control) when Traveling Straight in the Normal Mode In the Normal mode, when the standard driving acceleration XG is small, specifically, in a standard driving acceleration XG range inside the traction limit line Ls of "SNOW" (see FIG. 5) where slippage does not occur even on snowy roads, rear wheel-biased distribution control (best handling control), which determines the front and rear wheel drive distribution in accordance with the rear wheel-biased distribution curve L2 shown in FIG. 2, is performed instead of the dynamic load ratio distribution control. The upper limit standard driving acceleration XG (positive value) of the range in which rear wheel-biased distribution control is performed is referred to as a first input amount XG1, and the lower limit standard driving acceleration XG (negative value) is referred to as a second input amount XG2.

As shown in FIG. 2, the rear wheel-biased distribution curve L2 is a curve obtained by shifting the dynamic load ratio distribution curve L1 in the direction (right side) where the rear wheel distribution ratio Rr is high. In this rear wheel-biased distribution curve L2, the front and rear wheel drive distribution when the standard driving acceleration XG is zero is set to a distribution in which the rear wheel distribution ratio Rr is increased compared to the static load ratio, and a distribution that does not require fine correction of the accelerator and steering when cornering. The rear wheel-biased distribution curve L2 also takes into consideration the load change ΔWx due to acceleration in FIG. 4A, and increases (to the right) the rear wheel distribution ratio Rr as the standard driving acceleration XG increases (upward). This configuration provides a relatively large margin relative to the tire traction limit even under conditions of a high rear wheel drive distribution. Thus, when there is no sudden acceleration or deceleration and the acceleration or deceleration is within the traction limit in any of the road surface conditions, the rear wheel-biased distribution control is performed, thereby making it possible to improve handling performance.

The switching between the dynamic load ratio distribution control and the rear wheel-biased distribution control is performed along a transition curve L3 along the lower side of the upper traction limit line Ls of "SNOW" (see FIG. 5) or along a transition curve L4 along the upper side of the lower traction limit line of "SNOW" (not shown). This configuration allows smooth switching between the dynamic load ratio distribution control and the rear wheel-biased distribution control without the front and rear wheel drive distribution exceeding the traction limit of "SNOW."

Figure 4B:
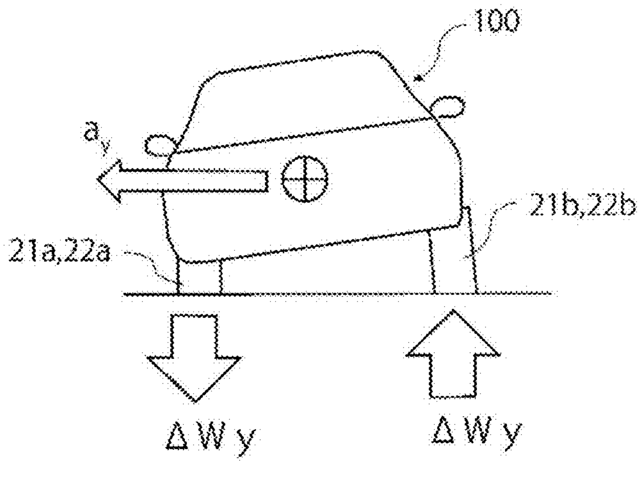

(3) Front and Rear Wheel Drive Distribution Control when Turning in the Normal Mode The drive distribution determination part 5 performs the dynamic load ratio distribution control and the rear wheel-biased distribution control when turning as well as when traveling straight. However, considering the rolling direction moment generated by the lateral acceleration ay when the vehicle turns as shown in FIG. 4B, when turning, the dynamic load ratio distribution and the rear wheel-biased distribution control are performed in accordance with the dynamic load ratio distribution curve L1a and the rear wheel-biased distribution curve L2a instead of the dynamic load ratio distribution curve L1 and the rear wheel-biased distribution curve L2 when traveling straight as shown in FIG. 2. The dynamic load ratio distribution curve L1a and the rear wheel-biased distribution curve L2a are obtained by slightly shifting the dynamic load ratio distribution curve L1 and the rear wheel-biased distribution curve L2 in a direction that increases the rear wheel distribution ratio Rr (to the right).

The reason for this is that, for example, when the vehicle turns to the right, as shown in FIG. 4B, a negative load change ΔWy is applied to the inner wheels (the right front wheel 21*b* and the right rear wheel 22*b*) due to the rolling direction moment generated by the lateral acceleration ay during vehicle turning, so the load applied to the inner wheels (the right front wheel 21*b* and the right rear wheel 22*b*) decreases. Particularly, when the vehicle is accelerating, as shown in FIG. 4A, a negative load change ΔWx is also applied to the front wheels 21 (the left front wheel 21*a* and the right front wheel 21*b* shown in FIG. 1) due to the pitching direction moment, so the load on the right front wheel 21*b* decreases the most, making it more likely to slip.

Further, when the vehicle turns to the left, particularly, when the vehicle is accelerating, for the same reason, the load on the left front wheel 21*a* decreases the most, making it more likely to slip.

Therefore, from the viewpoint of preventing slippage, the dynamic load ratio distribution curve L1a and the rear wheel-biased distribution curve L2a for turning are set to have a higher rear wheel drive distribution than the dynamic load ratio distribution curve L1 and the rear wheel-biased distribution curve L2a when traveling straight, in order to further reduce the driving force distribution to the right front wheel 21*b* and the left front wheel 21*a*.

(4) Front and Rear Wheel Drive Distribution Control in the Sport Mode

Figure 6:
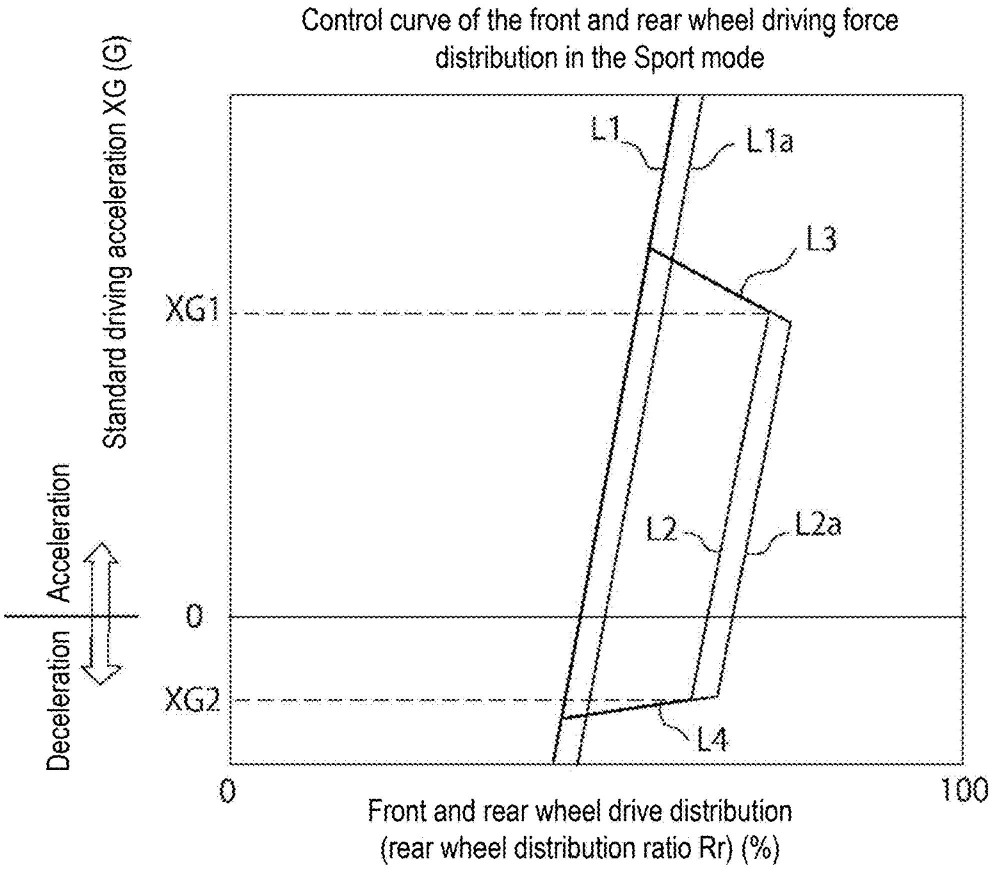
FIG. 6 is a diagram showing the control curve of the front and rear wheel driving force distribution in the Sport mode.

In the Sport mode, when the standard driving acceleration XG is inside the traction limit line Lw of "WET" (see FIG. 5) where slipping does not occur even on wet road surfaces, rear wheel-biased distribution control (best handling control) is performed, and when the standard driving acceleration XG is outside the line, dynamic load ratio distribution control (best traction control) is performed. FIG. 6 is a diagram showing the control curve of the front and rear wheel driving force distribution with respect to the standard driving acceleration XG in the Sport mode. In the Sport mode, as in the Normal mode, when traveling straight, dynamic load ratio distribution is performed in accordance with the dynamic load ratio distribution curve L1 and rear wheel-biased distribution control is performed in accordance with the rear wheel-biased distribution curve L2, and when turning, dynamic load ratio distribution is performed in accordance with the dynamic load ratio distribution curve L1a and rear wheel-biased distribution control is performed in accordance with the rear wheel-biased distribution curve L2a.

However, unlike the Normal mode, the first input amount XG1, which is the upper limit standard driving acceleration XG (positive value) of the range in which rear wheel-biased distribution control is performed, and the second input amount XG2, which is the lower limit standard driving acceleration XG (negative value), are set close to the traction limit line Lw of "WET" shown in FIG. 5. As a result, the rear wheel-biased distribution control (best handling control) is performed over a wider acceleration range than in the Normal mode.

The switching between the Normal mode and the Sport mode can be performed by a mode switching operation of the driver. As described above, in the Normal mode and the Sport mode, the first input amount XG1, which is the upper limit of the standard driving acceleration XG range in which rear wheel-biased distribution control is performed, and the second input amount XG2, which is the lower limit, are different, and these values can be changed by the mode switching operation of the driver.

This configuration provides the Sport mode which assumes only dry and wet road surfaces and expands the acceleration/deceleration range in which rear wheel-biased distribution control is performed, and the Normal mode which assumes snowy road surfaces in addition to dry and wet road surfaces and narrows the acceleration/deceleration range in which rear wheel-biased distribution control is performed, and can ensure a wide region of high handling performance in the Sport mode when the road surface is known to be not slippery as well as ensure stability in the Normal mode when the road surface is known to be slippery.

(5) Front and Rear Wheel Drive Distribution Control During Sudden Steering

The drive distribution determination part 5 is configured not to perform rear wheel-biased distribution control when the standard lateral acceleration YG calculated based on the steering amount of the steering wheel (steering device) 40 and the vehicle speed V and input from the lateral acceleration calculation part 3 is equal to or larger than the third input amount YG3, even if the standard driving acceleration XG is small. Here, the third input amount YG3 refers to the standard lateral acceleration YG at the limit at which the drive wheels do not slip on the road surface in a predetermined condition. This "standard lateral acceleration YG at the limit at which the drive wheels do not slip on the road surface in a predetermined condition" is, for example, standard lateral acceleration YG that does not exceed the traction limit in a predetermined road surface condition as shown in FIG. 5.

Figure 7:
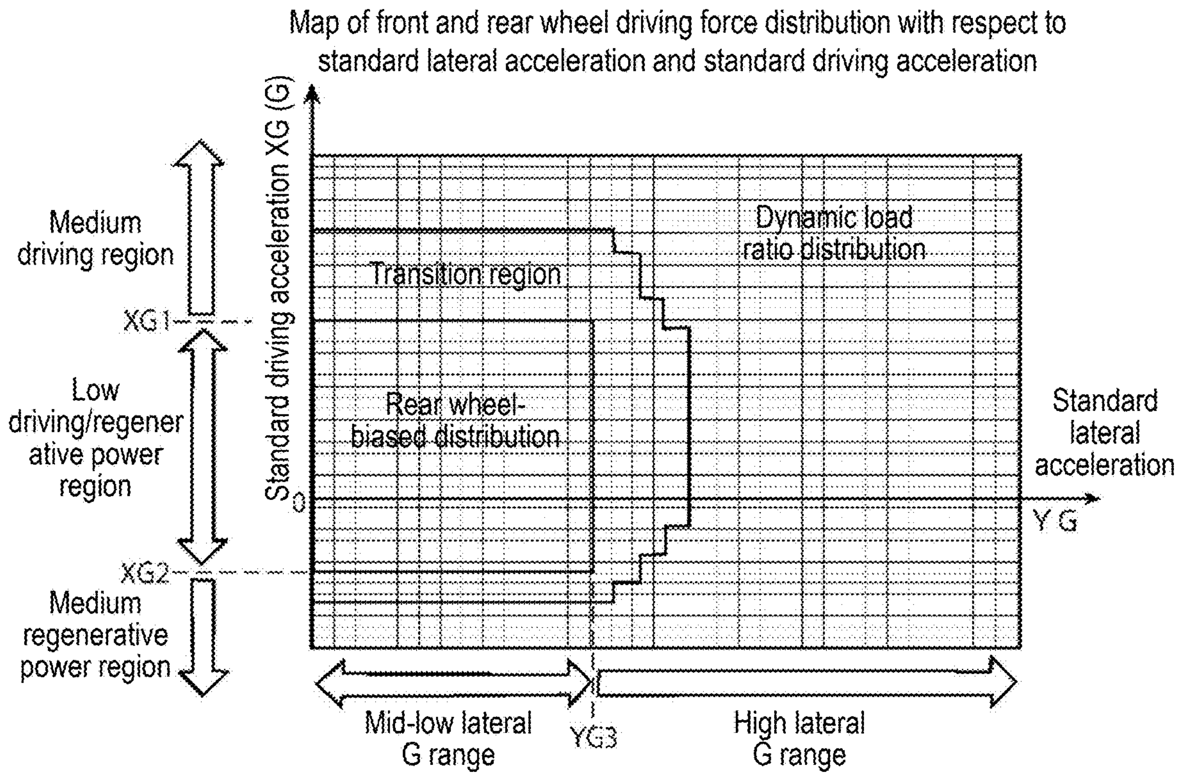
FIG. 7 is a map of the front and rear wheel driving force distribution with respect to standard lateral acceleration and standard driving acceleration.

FIG. 7 shows the map 4*a* of front and rear wheel driving force distribution with respect to the standard lateral acceleration YG and the standard driving acceleration XG. The map 4*a* is data arranged in a matrix, with the lateral position corresponding to the standard lateral acceleration YG and the vertical position corresponding to the standard driving acceleration XG. In each cell, the front and rear wheel drive distribution corresponding to the lateral position (YG) and vertical position (XG) is stored as a discrete value.

As shown in FIG. 7, in the region where the standard lateral acceleration YG to the left of the third input amount YG3 is not high, as described above, rear wheel-biased distribution control (best handling control) is performed in the range where the standard driving acceleration XG is small (between the first input amount XG1 and the second input amount XG2).

On the other hand, in the region where the standard lateral acceleration YG to the right of the third input amount YG3 is high, rear wheel-biased distribution control is not performed regardless of the standard driving acceleration XG.

According to this configuration, when lateral acceleration occurs due to sudden steering, rear wheel-biased distribution control is not performed, thereby making it possible to ensure traveling stability. Furthermore, since the control is based on the amount instructed by the driver such as the steering angle of the steering wheel 40, responsiveness is improved compared to feedback based only on actual acceleration or the like.

(6) Front and Rear Wheel Drive Distribution Control at Low Speed and High Speed

The drive distribution determination part 5 is configured not to perform rear wheel-biased distribution control when the vehicle speed V detected by the vehicle speed sensor 46 shown in FIG. 1 is lower than a first predetermined speed V1, which is the speed immediately after the vehicle starts and immediately before the vehicle stops, even if the standard driving acceleration XG is small. Furthermore, rear wheel-biased distribution control is not performed when the vehicle speed V is higher than a second predetermined speed V2, which is the speed during high-speed traveling.

Figure 8:
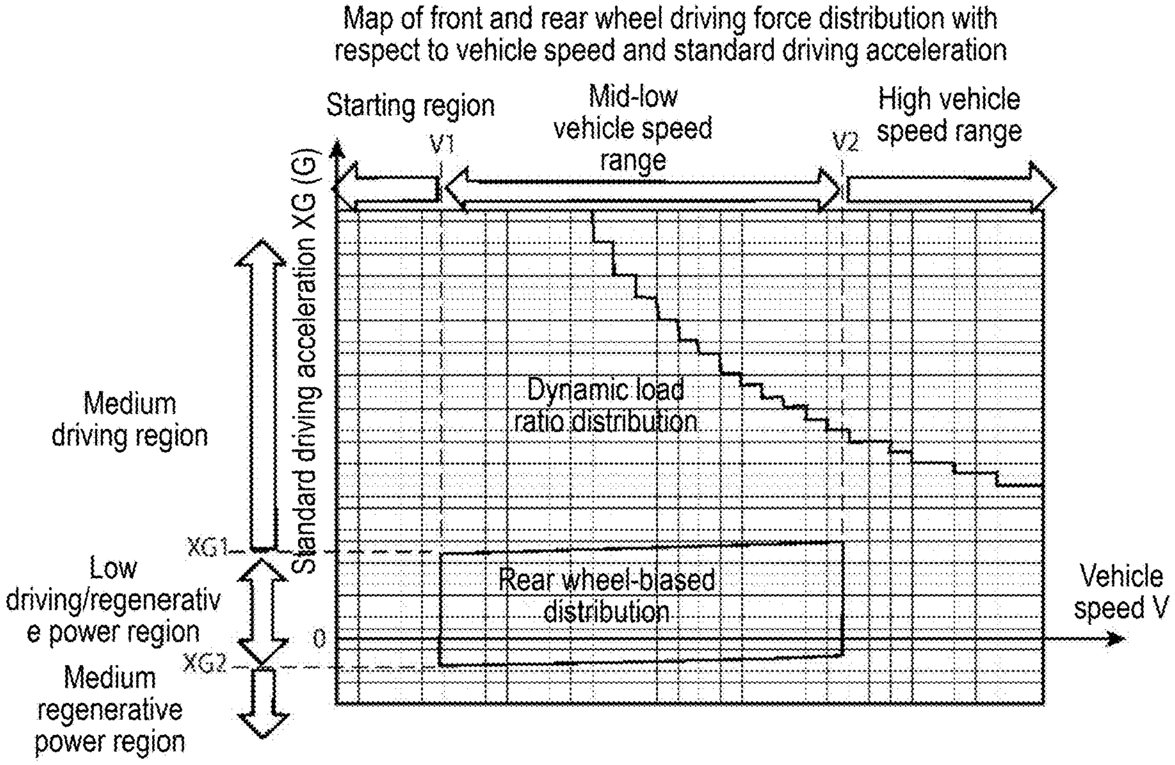
FIG. 8 is a map of the front and rear wheel driving force distribution with respect to vehicle speed and standard driving acceleration.

FIG. 8 shows the map **4*b* of front and rear wheel driving force distribution with respect to the vehicle speed V and the standard driving acceleration XG. This map 4*b*** is also data arranged in a matrix, with the lateral position corresponding to the vehicle speed V and the vertical position corresponding to the standard driving acceleration XG. In each cell, the front and rear wheel drive distribution corresponding to the lateral position (vehicle speed V) and vertical position (standard driving acceleration XG) is stored as a discrete value.

As shown in FIG. 8, in the region where the vehicle speed V is a low to medium speed between the first predetermined speed V1 and the second predetermined speed V2, as described above, rear wheel-biased distribution control (best handling control) is performed in the range where the standard driving acceleration XG is small (between the first input amount XG1 and the second input amount XG2). On the other hand, in the low speed region to the left of the first predetermined speed V1 and in the high speed region to the right of the second predetermined speed V2, rear wheel-biased distribution control is not performed.

According to this configuration, when the vehicle travels at a low speed immediately after starting and immediately before stopping which requires traction, or when the vehicle travels at a high speed which requires traveling stability, rear wheel-biased distribution control (best handling control) is not performed regardless of the front/rear and left/right acceleration/deceleration, and dynamic load ratio control (best traction control) is performed. Therefore, traction and traveling stability can be ensured in these cases.

Furthermore, with preparation of such maps **4*a* and 4*b*, the corresponding front and rear wheel drive distribution can be immediately obtained when the drive distribution determination part 5** specifies the vehicle speed V and the standard driving acceleration XG. Therefore, the rear wheel drive distribution can be determined more quickly compared to calculation based on computation, thereby increasing the speed of controlling the driving forces for the front and rear wheels.

Although embodiments of the disclosure have been described above, the disclosure is not limited to the above embodiments, and various modifications are possible within the scope of the claims and the scope of the technical ideas described in the specification and drawings. For example, the above embodiment illustrates an example of application of the driving force control apparatus 1 to the vehicle 100 with a front and rear twin-motor configuration that includes the front wheel drive motor 31 and the rear wheel drive motor 32. However, the disclosure is not limited thereto, and can also be applied to a vehicle with a four-motor configuration that has a drive motor for each of the four wheels, a single-motor configuration that distributes the driving force of one drive motor to the four wheels, and even a vehicle with a configuration that replaces each of these motors with a gasoline engine.

What is claimed is:

1. A driving force control apparatus, configured to determine a front and rear wheel drive distribution which is a ratio of driving force between front wheels and rear wheels in a four-wheel drive vehicle, and configured to:

calculate positive or negative standard driving acceleration obtained based on an input amount from a driving force instruction device of the vehicle and a vehicle speed, and based on the positive or negative standard driving acceleration, switch between and perform dynamic load ratio distribution control that determines the front and rear wheel drive distribution in accordance with a dynamic load ratio distribution curve which is a curve in which a rear wheel drive distribution increases as the calculated positive or negative standard driving acceleration increases, and rear wheel-biased distribution control that determines the front and rear wheel drive distribution in accordance with a rear wheel-biased distribution curve which increases the rear wheel drive distribution compared to the dynamic load ratio distribution curve and the rear wheel-biased distribution curve is a curve in which the rear wheel drive distribution increases as the calculated positive or negative standard driving acceleration increases, and switch to the rear wheel-biased distribution control when the positive or negative standard driving acceleration is equal to or smaller than a first input amount and equal to or larger than a second input amount.

2. The driving force control apparatus according to claim 1, wherein the dynamic load ratio distribution curve and the rear wheel-biased distribution curve are curves in which the rear wheel drive distribution increases as the standard driving acceleration increases, except for a transition curve therebetween.

3. The driving force control apparatus according to claim 2, wherein the rear wheel-biased distribution control is not performed in response to the vehicle speed of the vehicle being lower than a first predetermined speed.

4. The driving force control apparatus according to claim 2, wherein the switching between the dynamic load ratio distribution control and the rear wheel-biased distribution control is performed along the transition curve extending along a lower side of an upper traction limit line corresponding to a traction limit of tires on a road surface in a predetermined condition.

5. The driving force control apparatus according to claim 1, wherein the first input amount is standard driving acceleration that provides acceleration at a limit at which drive wheels do not slip on a road surface in a predetermined condition.

6. The driving force control apparatus according to claim 5, wherein the rear wheel-biased distribution control is not performed in response to the vehicle speed of the vehicle being lower than a first predetermined speed.

7. The driving force control apparatus according to claim 1, wherein the second input amount is standard driving acceleration that provides deceleration at a limit at which drive wheels do not slip on a road surface in a predetermined condition.

8. The driving force control apparatus according to claim 1, wherein a value of the first input amount is changeable by a mode switching operation of a driver.

9. The driving force control apparatus according to claim 1, wherein a value of the second input amount is changeable by a mode switching operation of a driver.

10. The driving force control apparatus according to claim 1, wherein the rear wheel-biased distribution control is not performed in response to standard lateral acceleration calculated based on a steering amount of a steering device of the vehicle and the vehicle speed being equal to or larger than a third input amount.

11. The driving force control apparatus according to claim 10, wherein the third input amount is standard lateral acceleration at a limit at which drive wheels do not slip on a road surface in a predetermined condition.

12. The driving force control apparatus according to claim 1, wherein the rear wheel-biased distribution control is not performed in response to the vehicle speed of the vehicle being lower than a first predetermined speed.

13. The driving force control apparatus according to claim 1, wherein the rear wheel-biased distribution control is not performed in response to the vehicle speed of the vehicle being higher than a second predetermined speed.

14. The driving force control apparatus according to claim 1, wherein a drive source for the front wheels of the vehicle is a drive source comprising an electric motor.

15. The driving force control apparatus according to claim 1, wherein a drive source for the rear wheels of the vehicle is a drive source comprising an electric motor.

16. The driving force control apparatus according to claim 1, wherein a drive source for the front wheels and the rear wheels of the vehicle is a drive source comprising an electric motor.

17. The driving force control apparatus according to claim 1, further comprising a map in which the vehicle speed, standard lateral acceleration calculated based on a steering amount of a steering device, standard driving acceleration calculated based on the input amount from the driving force instruction device, and the front and rear wheel drive distribution are recorded, wherein the front and rear wheel drive distribution is determined based on the map.

18. The driving force control apparatus according to claim 1, wherein the driving force instruction device is at least one of an accelerator operator and a brake operator, and the input amount from the driving force instruction device is at least one of an operation amount of the accelerator operator and an operation amount of the brake operator.

19. The driving force control apparatus according to claim 1, wherein the rear wheel-biased distribution control is not performed in response to the vehicle speed of the vehicle being lower than a first predetermined speed.

* * * * *